(12) United States Patent
Hu et al.

(10) Patent No.: US 12,550,089 B2
(45) Date of Patent: Feb. 10, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 342 days.

(21) Appl. No.: 18/207,552

(22) Filed: Jun. 8, 2023

(65) Prior Publication Data

US 2023/0328674 A1  Oct. 12, 2023

Related U.S. Application Data

(63) Continuation of application No. PCT/CN2020/137296, filed on Dec. 17, 2020.

(51) Int. Cl.
*H04W 56/00* (2009.01)

(52) U.S. Cl.
CPC .............. *H04W 56/0045* (2013.01)

(58) Field of Classification Search
CPC .......... H04B 7/18513; H04W 56/0045; H04W 56/001; H04W 56/0035; H04W 74/006
See application file for complete search history.

(56) References Cited

U.S. PATENT DOCUMENTS

| 9,860,914 | B2 * | 1/2018 | Chen ................... H04W 72/23 |
| 11,706,800 | B2 * | 7/2023 | Sun .................. H04W 74/0808 |
| | | | 370/329 |
| 2018/0070317 | A1 * | 3/2018 | Chen .................. H04W 52/242 |
| 2019/0098659 | A1 * | 3/2019 | Reddy ................. H04W 74/004 |
| 2019/0380151 | A1 | 12/2019 | Kim et al. |
| 2019/0387508 | A1 * | 12/2019 | Park ...................... H04W 72/23 |
| 2020/0221481 | A1 * | 7/2020 | Park .................. H04W 72/0466 |
| 2020/0367097 | A1 | 11/2020 | Tarimala et al. |
| 2021/0337570 | A1 * | 10/2021 | Yang .................... H04L 5/0048 |

(Continued)

FOREIGN PATENT DOCUMENTS

| CN | 102938931 A | 2/2013 |
| CN | 106972915 A | 7/2017 |

(Continued)

OTHER PUBLICATIONS

Second Office Action issued by the Chinese Patent Office for Application No. CN202080107051.8 mailed on Feb. 15, 2025.

(Continued)

*Primary Examiner* — Bailor C Hsu

(74) *Attorney, Agent, or Firm* — Sheppard, Mullin, Richter & Hampton LLP

(57) ABSTRACT

Embodiments of the present disclosure provide a wireless communication method, a terminal device, and a network device. The method includes: obtaining configuration information of an uplink gap; and transmitting, based on the configuration information of the uplink gap repeatedly, uplink information on an uplink channel. The uplink gap is used for a terminal device to perform TA pre-compensation or TA adjustment on the uplink gap.

19 Claims, 8 Drawing Sheets

(56) References Cited

U.S. PATENT DOCUMENTS

2022/0330184 A1     10/2022   Lei
2023/0370989 A1*    11/2023   Wang .................... H04B 7/155

FOREIGN PATENT DOCUMENTS

| | | | |
|---|---|---|---|
| CN | 109923908 | A | 6/2019 |
| CN | 110545136 | A | 12/2019 |
| CN | 111064539 | A | 4/2020 |
| CN | 111182630 | A | 5/2020 |
| CN | 111316723 | A | 6/2020 |
| CN | 111510954 | A | 8/2020 |
| CN | 111565448 | A | 8/2020 |
| CN | 115174025 | A | 10/2022 |
| CN | 116600389 | A | 8/2023 |
| WO | 2019213977 | A | 11/2019 |
| WO | 2021109447 | A1 | 6/2021 |

OTHER PUBLICATIONS

Extended European Search Report dated Dec. 19, 2023 received in European Patent Application No. EP20965536.4.

International Search Report and Written Opinion dated Sep. 7, 2021 in International Application No. PCT/CN2020/137296. English translation attached.

MediaTek Inc. "New Study WID on NB-IoT/eTMC support for NTN", 3GPP TSG RAN Meeting #86 RP-193235, Dec. 2019, Section 4.

Office Action issued by the European Patent Office for Application No. 20965536.4 mailed on Sep. 27, 2024.

Office Action issued by the Chinese Patent Office for Application No. 202080107051.8 mailed on Oct. 12, 2024.

Rejection Decision issued by the Chinese Patent Office for Application No. CN202080107051.8 mailed on May 15, 2025.

\* cited by examiner

Represent a preamble

Represent an uplink gap

Represent an NPUSCH

Represent an uplink gap

WIRELESS COMMUNICATION METHOD, TERMINAL DEVICE, AND NETWORK DEVICE

CROSS-REFERENCE TO RELATED APPLICATIONS

The present application is a continuation of International Application No. PCT/CN2020/137296 filed on Dec. 17, 2020, which is incorporated herein by reference in its entirety.

FIELD

The embodiments of the present disclosure relate to the communication field, and more particularly, to a wireless communication method, a terminal device, and a network device.

BACKGROUND

Uplink channels supported by a narrow band internet of things (NB-IoT) network includes a narrowband physical random access channel (NPRACH) and a narrowband physical uplink shared channel (NPUSCH). A repeated transmission mechanism is introduced on the NPRACH and the NPUSCH, and an NB-IoT terminal only supports a half-duplex type-B mode, namely, a terminal device can only receive data or transmit data at a same moment, but not simultaneously transceive data. Therefore, for an uplink transmission with a longer time length, an uplink (UL) gap, namely, a UL gap is introduced. The uplink gap is mainly used for performing synchronous tracking and frequency offset (crystal oscillator frequency offset) compensation by means of a narrowband primary synchronization signal (NPSS), a narrowband secondary synchronization signal (NSSS), or a narrowband reference signal (NRS).

At present, the uplink gap is predefined in a protocol. The NB-IoT terminal has the feature of low mobility, and a base station is also stationary in a terrestrial network. Therefore, channel quality of the NB-IoT terminal usually changes slowly, and using a predefined manner to define the uplink gap is reasonable.

However, in a non-terrestrial communication network (NTN), for a non-geostationary earth orbit (GEO) scenario, even if the terminal device is in a static state, a wireless signal transmission delay between the terminal device and the network changes continuously with a rapid movement of a satellite. In addition, on one hand, wireless channel change rules between terminal devices covered by non-GEO satellites at different orbital altitudes and the network are different; on the other hand, because the NTN network has a coverage range far greater than that of the terrestrial network, wireless channel change rules between terminal devices located at different geographic positions in a same cell and the network are also different. Therefore, predefining the uplink gap is not suitable for the non-GEO scenario in the NTN network.

SUMMARY

Embodiments of the present disclosure provide a wireless communication method, a terminal device, and a network device.

In a first aspect, a wireless communication method is provided. The method includes: obtaining configuration information of an uplink gap; and transmitting, based on the configuration information of the uplink gap repeatedly, uplink information on an uplink channel. The uplink gap is used for a terminal device to perform timing advance (TA) pre-compensation or a TA adjustment on the uplink gap.

In a second aspect, a network device is provided. The network device includes a processor and a memory. The memory has a computer program stored thereon, and the processor is configured to invoke and execute the computer program stored in the memory to perform a wireless communication method is provided. The method includes: transmitting configuration information of an uplink gap, the uplink gap being used for a terminal device to perform TA pre-compensation or a TA adjustment on the uplink gap.

In a third aspect, a terminal device is provided. The terminal device includes a processor and a memory. The memory has a computer program stored thereon, and the processor is configured to invoke and execute the computer program stored in the memory to perform the method according to the above first aspect or any implementation thereof.

DETAILED DESCRIPTION

Figure 1:
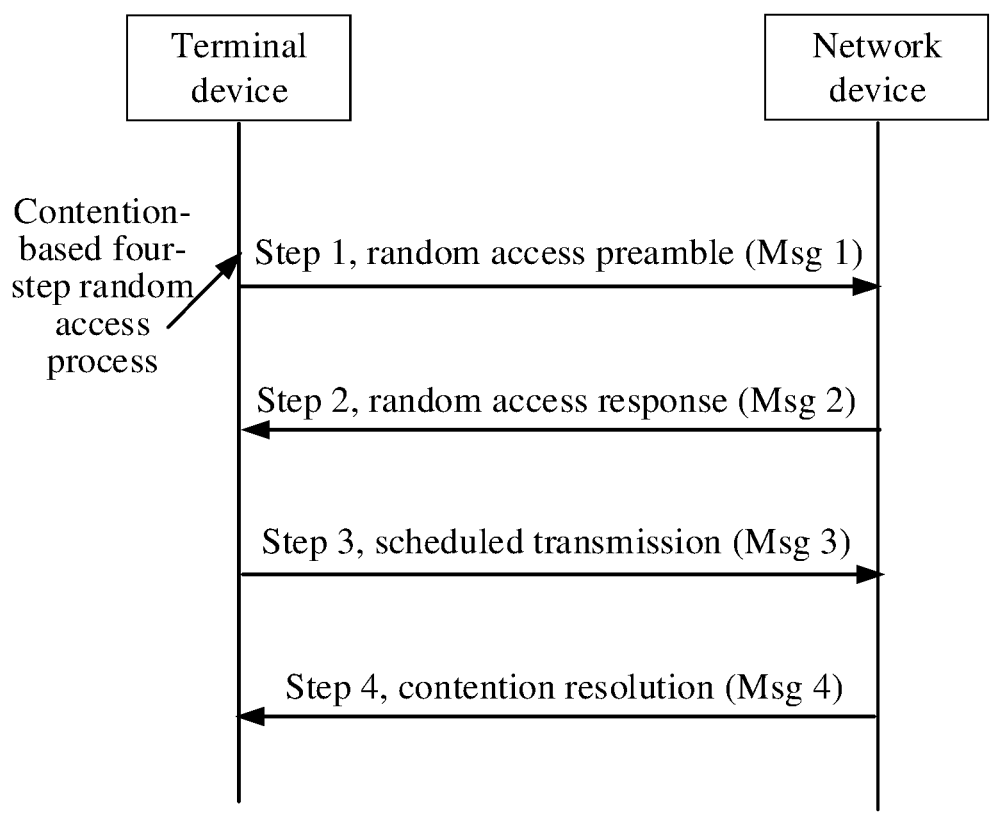
FIG. 1 is an interaction flowchart of a contention-based four-step random access process.

The technical solutions in embodiments of the present disclosure will be described below with reference to accompanying drawings. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

Before the technical solutions of the present disclosure are introduced, related knowledge of the present disclosure will be described below.

Firstly, provided is a related background of NTN.

At present, an NTN technology is studied in a 3rd generation partnership project (3GPP), and the NTN generally provides a terrestrial user with a communication service using a satellite communication manner. A satellite communication has many unique advantages over a terrestrial cellular network communication. Firstly, the satellite communication is not limited by a region where a user is located. For example, a general terrestrial communication may not cover a region where a communication device is not capable of being set up or where communication coverage is not provided due to rare population, such as oceans, mountains, and deserts. However, for the satellite communication, a satellite may cover a large ground and orbit around the earth, so each corner on the earth may be covered by the satellite communication theoretically. Secondly, the satellite communication has a large social value. It may cover remote mountainous regions and poor or less-developed countries or regions at a lower cost, enabling people in these regions to enjoy advanced voice communication and mobile Internet technology, which is beneficial to reducing digital gaps between these regions and developed regions and promoting the development of these regions. Next, the satellite communication has a long distance and its communication cost does not obviously increase with the communication distance. Eventually, the satellite communication has high stability and is not limited by natural disasters.

Communication satellites are divided into a low-earth orbit (LEO) satellite, a medium-earth orbit (MEO) satellite, a GEO satellite, a high elliptical orbit (HEO) satellite, and the like based on different orbital altitudes. At the current stage, LEO and GEO are mainly studied.

LEO

The LEO satellite has an altitude in the range of 500 km to 1500 km and a corresponding orbital period about 1.5 hours to 2 hours. A signal propagation delay of inter-user single-hop communication is generally smaller than 20 ms. A maximum satellite visual time is 20 minutes. The LEO satellite has a short signal propagation distance and a low link loss, which has no strict requirement for transmission power of a user terminal.

GEO

The GEO satellite has an orbital altitude of 35786 km and a 24-hour rotation period around the earth. The signal propagation delay of inter-user single-hop communication is generally 250 ms.

In order to ensure coverage of the satellite and improve a system capacity of an entire satellite communication system, the satellite uses a plurality of beams to cover the ground, and one satellite may form tens or even hundreds of beams to cover the ground; and a satellite beam may cover a terrestrial region having a diameter of dozens to hundreds of kilometers.

Secondly, description is given about an uplink gap for an NB-IoT terminal.

As described above, uplink channels supported by an NB-IoT network includes an NPRACH and an NPUSCH. The NPRACH is used to transmit a preamble. The NPUSCH supports two formats including format 1 and format 2. NPUSCH format 1 is used for transmitting uplink data, and NPUSCH format 2 is used for transmitting hybrid automatic repeat request-acknowledgement (HARQ-ACK) feedback information.

A repeated transmission mechanism is introduced on the NPRACH and the NPUSCH, and a maximum number of times of repeated transmissions thereof may reach 2048. Meanwhile, the NB-IoT terminal only supports an FDD half-duplex type-B mode, namely, a terminal device can only receive data or transmit data at a same moment, but can not simultaneously transceive data. Therefore, for an uplink transmission with a longer time length, an uplink (UL) gap, namely, a UL gap is introduced. The uplink gap is mainly used for performing synchronous tracking and frequency offset (crystal oscillator frequency offset) compensation by means of an NPSS, an NSSS, or an NRS.

At present, the uplink gap is predefined in a protocol. Details are as follows.

For the NPUSCH: 256 ms data is transmitted, and frequency offset compensation is performed by means of an uplink gap of 40 ms.

For the NPRACH: after the preamble is transmitted 64 times, the frequency offset compensation is performed by means of the uplink gap of 40 ms.

Thirdly, description is given about a random access process in a long term evolution (LTE) system.

FIG. 1 is an interaction flowchart of a contention-based four-step random access process.

As illustrated in FIG. 1, the random access process may include the following four steps.

In step 1, provided is Msg 1.

The Msg 1 is transmitted by the terminal device to a network device to tell the network device that the terminal device initiates a random access request, and carries a random access preamble (RAP), or a random access preamble sequence, a preamble sequence, a preamble, etc. The Msg 1 may also be used for the network device to estimate a transmission delay between the network device and the terminal device and calibrate an uplink time based on the transmission delay.

In some embodiments, the terminal device selects a preamble index and a PRACH resource for transmitting the preamble, and then transmits the preamble on a PRACH. The network device informs all terminal devices on which time-frequency resources transmission of the preamble is allowable, through a system information block (SIB), for example, a SIB.

In step 2, provided is Msg 2.

After receiving the Msg 1 transmitted by the terminal device, the network device transmits the Msg 2, namely, a Random Access Response (RAR) message, to the terminal device. For example, the Msg 2 may carry a TA, an uplink grant instruction like uplink resource configuration, a temporary cell-radio network temporary identity (TC-RNTI), and the like.

The terminal device monitors a physical downlink control channel (PDCCH) in the RAR Window for receiving the RAR message replied by the network device. The RAR message may be descrambled using a corresponding random access radio network temporary identifier (RA-RNTI).

When the terminal device receives no RAR message replied by the network device in the RAR window, it is considered that the random access process fails.

When the terminal device successfully receives an RAR message, and a preamble index carried in the RAR message is the same as a preamble index transmitted by the terminal device by means of the Msg 1, it is considered that an RAR is successfully received, and the terminal device may stop monitoring within the RAR window at this time.

Here, the Msg 2 may include RAR messages for a plurality of terminal devices, and the RAR message of each of the plurality of terminal devices may include a RAP identity (RAPID) used by the terminal device, information of resources for transmitting Msg 3, TA adjustment information, a TC-RNTI, and the like.

In step 3, provided is the Msg 3.

After receiving the RAR message, the terminal device judges whether the RAR is its own RAR message. For example, the terminal device may use a preamble identity to check, and may generate, after determining that the RAR is its own RAR message, the Msg 3 in an radio resource control (RRC) layer and transmits the Msg 3 to the network device, in which identification information of the terminal device needs to be carried among others.

In some embodiments, for different random access trigger events, the Msg 3 in step 3 of the four-step random access process may include different contents for a scheduled transmission.

For example, for an initial access scenario, the Msg 3 may include an RRC connection request generated by the RRC layer, which at least carries non-access stratum (NAS) identification information of the terminal device, and may also carry a serving-temporary mobile subscriber identity (S-TMSI) of the terminal device, a random number, or the like.

For another example, for a connection re-establishment scenario, the Msg 3 may include an RRC connection re-establishment request generated by the RRC layer without carrying any NAS message. In addition, the Msg 3 may also carry, for example, a cell radio network temporary identifier (C-RNTI), protocol control information (PCI), etc.

For another example, for a handover scenario, the Msg 3 may include an RRC handover confirm generated by the RRC layer and a C-RNTI of the terminal device, and carry a buffer status report (BSR); and for a scenario of other trigger events such as arrival of uplink/downlink data, the Msg3 at least needs to include the C-RNTI of the terminal device.

In step 4, provided is Msg 4.

The network device transmits the Msg4 to the terminal device, and the terminal device correctly receives the Msg4 to complete contention resolution. For example, in an RRC connection establishment process, the Msg 4 may carry an RRC connection establishment message.

The terminal device in step 3 carries its own unique identifier such as the C-RNTI or identification information from a core network (like the S-TMSI or the random number) in the Msg 3, so that in a contention resolution mechanism, the network device carries the unique identifier of the terminal device in the Msg4 to specify a terminal device winning in contention. Other terminal devices not winning in the contention resolution will re-initiate random access.

In a current LTE, considering a switching time between transmitting and receiving operations of the terminal device, the terminal device starts the RAR window after a period of time following transmission of the Msg1. For the NB-IoT terminal, a start subframe of the RAR window is denoted as n+X; n represents a last subframe where a last repeated transmission including the preamble is located, and a value of X is determined based on time division duplex (TDD) or FDD and a number of times of NPRACH repeated transmissions. In some embodiments, the value of X may be determined by Table 1.

TABLE 1

| TDD or FDD mode | Preamble format | number of repetitions of NPRACH | X |
|---|---|---|---|
| FDD | 0 or 1 | ≥64 | 41 |
| FDD | 0 or 1 | <64 | 4 |
| FDD | 2 | ≥16 | 41 |
| FDD | 2 | <16 | 4 |
| TDD | Any value | Any value | 4 |

It should be noted that, in the present disclosure, the RAR window is also referred to as an RAR receiving window, an RAR time window, etc., which is not limited in the present disclosure.

Fourthly, description is given about a TA mechanism in an NR system.

One of important features of the uplink transmission is that different terminal devices access in a time-frequency orthogonal multiple access manner, namely, uplink transmissions of different terminal devices from the same cell do not interfere with each other. In order to ensure orthogonality of the uplink transmissions and avoid intra-cell interference, the network device requires that signals from different terminal devices at the same time but different frequency domain resources arrive at the network device basically in a time-aligned manner. In order to ensure time synchronization at a network device side, the NR supports an uplink TA mechanism.

Figure 2:
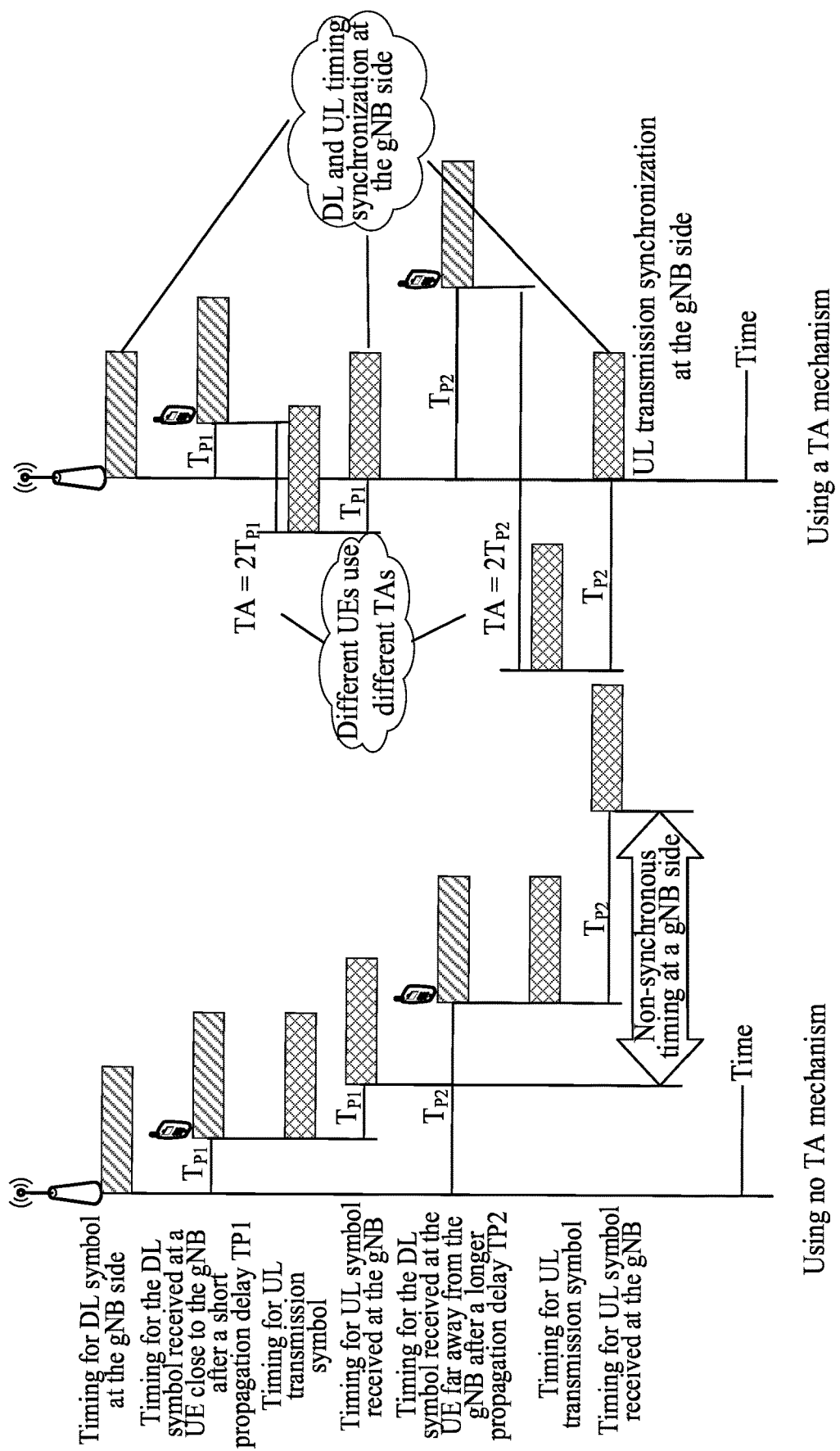
FIG. 2 is a schematic diagram of time synchronization at a gNB side according to an embodiment of the present disclosure.

FIG. 2 is a schematic diagram of time synchronization at a gNB side according to an embodiment of the present disclosure. As illustrated in a leftward drawing of FIG. 2, when the TA mechanism is not used, an uplink clock and a downlink clock on a UE side are the same. For a downlink symbol transmitted by the gNB side, since propagation delays between different UEs and the gNB are different, times for arrival of uplink data from different UEs at the gNB side are not synchronized. As illustrated in a rightward drawing of FIG. 2, an offset is provided between the uplink clock and the downlink clock at the UE side, and different UEs have different uplink TA values, namely, the TA mechanism is introduced. The gNB may control the times for arrival of the uplink data from different UEs at the gNB by appropriately controlling the TA value corresponding to each UE, enabling the times for arrival of the uplink data from different UEs at the gNB side to be synchronized and to synchronize with downlink timing of the gNB side. In some embodiments, a UE far away from the gNB needs to transmit the uplink data earlier than a UE closer to the gNB because of a large transmission delay.

Here, the gNB determines the TA value of each UE by measuring the uplink transmission of the UE and transmits a TA command to the UE in one of the following two manners.

Obtaining an initial TA: in the random access process, the gNB determines the TA value by measuring the received preamble, and transmits the TA value to the UE through a timing advance command field of the RAR.

Adjustment of the TA in an RRC connection state: although in the random access process, the UE and the gNB achieve uplink synchronization, timing for arrival of the uplink signal at the gNB may change over time. Therefore, the UE needs to continuously update the uplink TA value thereof, to maintain the uplink synchronization. When the TA value of a UE needs to be corrected, the gNB transmits a timing advance command to the UE, requiring the UE to adjust the TA value. The timing advance command is transmitted to the UE through the Timing Advance Command media access control control element (MAC CE).

As described above, the NB-IoT terminal has the feature of low mobility, and a base station is also stationary in a terrestrial network. Therefore, channel quality of the NB-IoT terminal usually changes slowly, and using a predefined manner to define the uplink gap is reasonable.

However, in the NTN, for a non-GEO scenario, even if the terminal device is in a static state, a wireless signal transmission delay between the terminal device and the network changes continuously with a rapid movement of a satellite. In addition, on one hand, wireless channel change rules between terminal devices covered by non-GEO satellite at different orbital altitudes and the network are different; on the other hand, because the NTN network has a coverage range far greater than that of the terrestrial network, wireless channel change rules between terminal devices located at different geographic positions in a same cell and the network are also different. Therefore, predefining the uplink gap is not suitable for the non-GEO scenario in the NTN network.

In order to solve the above technical problem, the present disclosure may configure different uplink gaps for different NB-IoT terminals, to be applicable to the non-GEO scenario in the NTN network.

A communication system architecture in the present disclosure is described below in conjunction with FIG. 3A and FIG. 3B.

Figure 3A:
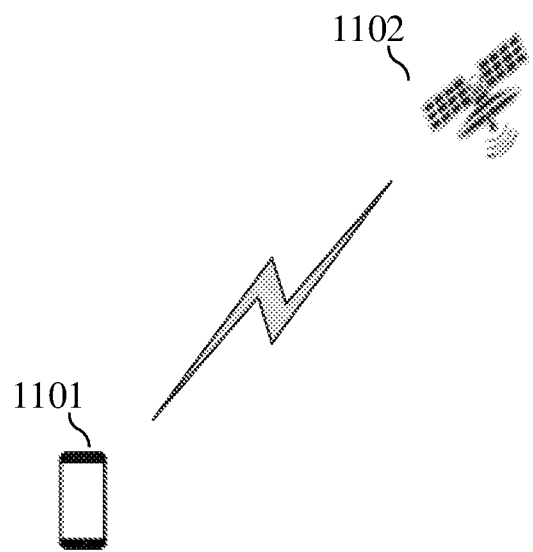
FIG. 3A is a schematic diagram showing a communication system architecture according to an embodiment of the present disclosure.

FIG. 3A is a schematic diagram showing a communication system architecture according to an embodiment of the present disclosure. Referring to FIG. 3, provided are a terminal device 1101 and a satellite 1102, and a wireless communication may be performed between the terminal device 1101 and the satellite 1102. A network formed between the terminal device 1101 and the satellite 1102 may also be referred to as the NTN. In the communication system architecture illustrated in FIG. 3A, the satellite 1102 may have a function of the base station and may be in direct communication with the terminal device 1101. Under the system architecture, the satellite 1102 may be referred to as the network device. Optionally, a communication system may include a plurality of network devices 1102, and other numbers of terminal devices may be covered within each of the plurality of network devices 1102. The embodiment of the present disclosure is not limited to this.

Figure 3B:
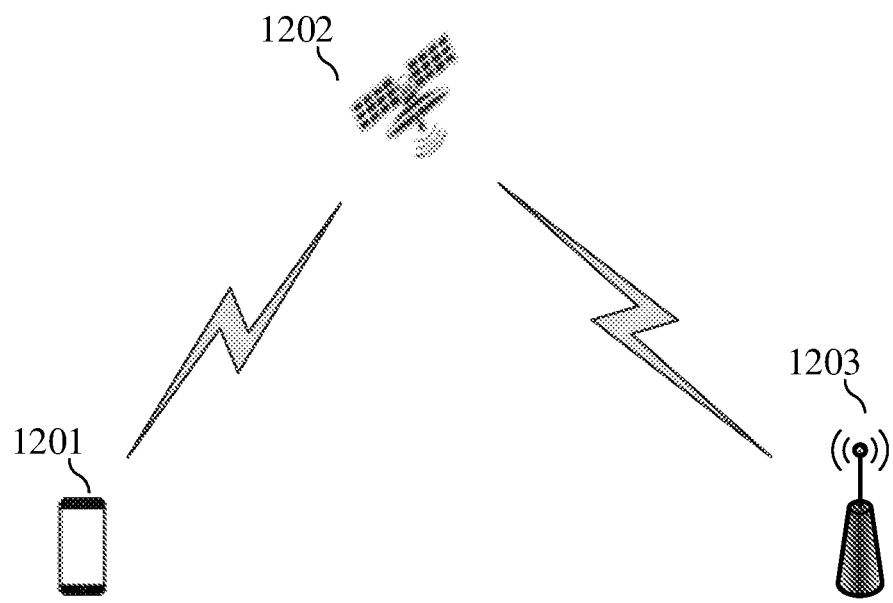
FIG. 3B is a schematic diagram showing another communication system architecture according to an embodiment of the present disclosure.

FIG. 3B is a schematic diagram showing another communication system architecture according to an embodiment of the present disclosure. Referring to FIG. 3B, a terminal device 1201, a satellite 1202, and a base station 1203 are included, the wireless communication may be performed between the terminal device 1201 and the satellite 1202, and the satellite 1202 may communicate with the base station 1203. A network formed between the terminal device 1201, the satellite 1202, and the base station 1203 may also be referred to as the NTN. In the communication system architecture illustrated in FIG. 3B, the satellite 1202 may not have the function of the base station, and communication between the terminal device 1201 and the base station 1203 needs to be relayed by the satellite 1202. In this system architecture, the base station 1203 may be referred to as the network device. Optionally, the communication system may include a plurality of network devices 1203, and a coverage range of each of the plurality of network devices 1203 may include other numbers of terminal devices. The embodiment of the present disclosure is not limited to this.

Optionally, the wireless communication system illustrated in FIG. 3A and FIG. 3B may further include other network entities such as a mobility management entity (MME), an access and mobility management function (AMF), and the like. The embodiment of the present disclosure is not limited to this.

It should be understood that terms "system" and "network" are often used interchangeably herein.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or licensed spectrum. The unlicensed spectrum may also be deemed to be shared spectrum. The licensed spectrum may also be deemed to be non-shared spectrum.

The embodiments of the present disclosure are described in conjunction with the network device and the terminal device. The terminal device may be the NB-IoT terminal or a non-NB-IoT terminal. In the present disclosure, the terminal device may refer to a user equipment (UE), an access terminal, a user unit, a user station, a mobile station, a remote station, a remote terminal, a mobile device, a user terminal, a terminal, a wireless communication device, a user agent, or a user device.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

Optionally, as illustrated in FIG. 3B, the network device may be the base station. As illustrated in FIG. 3A, the network device may have mobile characteristics, e.g., the network device may be a movable device. Optionally, the network device may be a satellite or a balloon station. For example, the satellite may be the LEO satellite, the MEO satellite, the GEO satellite, the HEO satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

The technical solutions of the present disclosure will be described in detail below.

Embodiment 1

Figure 4:
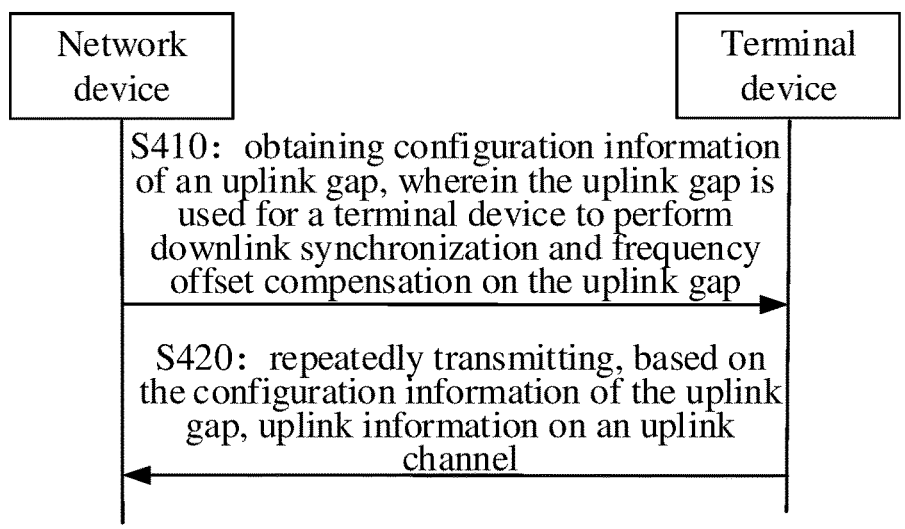
FIG. 4 is an interaction flowchart of a wireless communication method according to an embodiment of the present disclosure.

FIG. 4 is an interaction flowchart of a wireless communication method according to an embodiment of the present disclosure. As illustrated in FIG. 4, the method includes the following actions.

In block S410, configuration information of the uplink gap is obtained by the terminal device. The uplink gap is used for the terminal device to perform the downlink synchronization and frequency offset compensation on the uplink gap.

In block S420, uplink information on an uplink channel is repeatedly transmitted by the terminal device based on the configuration information of the uplink gap.

Optionally, the configuration information of the uplink gap is carried in, without limitation, any one of: a broadcast message, an RRC signaling, a MAC CE, and downlink control information (DCI).

Optionally, the configuration information of the uplink gap includes: a time length of the uplink gap, and/or an insertion interval of the uplink gap. The uplink gap occurs whenever the uplink channel lasts for the insertion interval.

Figure 5A:
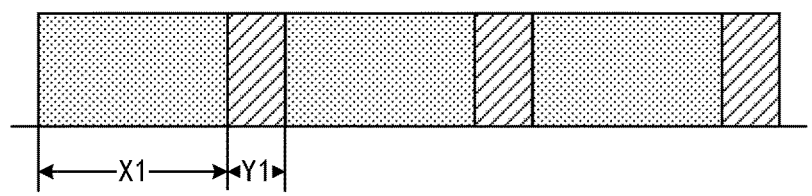
FIG. 5A is a schematic diagram of configuration of an uplink gap corresponding to an NPRACH according to an embodiment of the present disclosure.
Figure 5A:
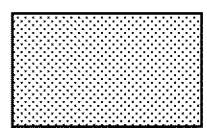
Figure 5A:
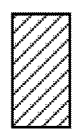
Figure 5B:
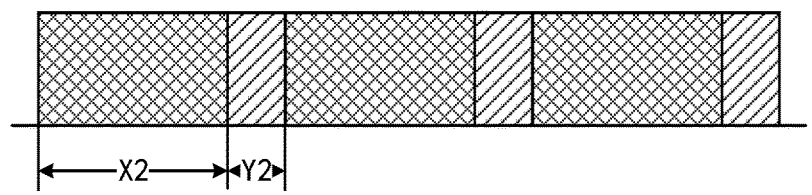
FIG. 5B is a schematic diagram of configuration of an uplink gap corresponding to an NPUSCH according to an embodiment of the present disclosure.
Figure 5B:
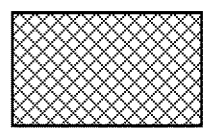
Figure 5B:
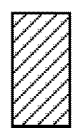

For example, FIG. 5A is a schematic diagram of configuration of an uplink gap corresponding to an NPRACH according to an embodiment of the present disclosure. As illustrated in FIG. 5A, an uplink gap with a time length of Y1 occurs whenever the NPRACH lasts for an insertion interval X1. FIG. 5B is a schematic diagram of configuration of an uplink gap corresponding to an NPUSCH according to an embodiment of the present disclosure. As illustrated in FIG. 5B, an uplink gap with a time length of Y2 occurs whenever the NPUSCH lasts for an insertion interval X2.

It is worth mentioning that the present disclosure is not limited with regard to how the network device determines the time length of the uplink gap, and/or the insertion interval of the uplink gap.

Optionally, the time length of the uplink gap may be predefined, and the network device only needs to configure the terminal device with the insertion interval of the uplink gap. Alternatively, the insertion interval of the uplink gap may be predefined, and the network device only needs to configure the terminal device with the time length of the uplink gap.

Optionally, the network device may further transmit resource configuration of the uplink channel to the terminal device.

Optionally, the resource configuration of the uplink channel is carried in, without limitation, any one of: the broadcast message, the RRC signaling, the MAC CE, and the DCI.

Optionally, the uplink channel may be the NPRACH or the NPUSCH, but is not limited thereto.

Optionally, when the uplink channel is the NPRACH, the uplink information may be a preamble transmitted on the NPRACH. When the uplink channel is the NPUSCH, the uplink information may be uplink data or HARQ-ACK feedback information transmitted on the NPUSCH.

Optionally, when broadcasting resource configuration of the NPRACH through the broadcast message, the network device may broadcast or configure the resource configuration of at least one NPRACHs one time. Based on this, the configuration information of the uplink gap is configuration information for the at least one NPRACHs, namely, the configuration information of the uplink gap may correspond to one NPRACH resource or a plurality of NPRACH resources. For example, the configuration information of the uplink gap may be configured based on each set of NPRACH resources, or all NPRACH resources may use the same configuration information of the uplink gap.

Optionally, the resource configuration of each NPRACH includes, but is not limited to, at least one of: a cycle of the NPRACH, a start time of the NPRACH resource in one cycle, a start subcarrier position of the NPRACH resource, a number of consecutive subcarriers occupied by the NPRACH resource on frequency domain, and a number of times of repeated transmissions of the preamble.

In summary, in the present disclosure, the configuration information of the uplink gap is not predefined, but configured by the network device to the terminal device, which allows for differentiating configuration information of the uplink gaps corresponding to different terminal devices, so as to adapt to the non-GEO scenario in the NTN network.

Embodiment 2

For the non-GEO scenario in the NTN network, since a round trip time (RTT) changes quickly, the terminal device needs to frequently adjust the TA. For uplink transmission with a large number of repetitions, the terminal device also needs to continuously adjust the TA during the repeated transmissions. For a case where the TA becomes smaller, the terminal device may simultaneously perform the TA adjustment and the uplink transmission. However, for a case where the TA becomes larger, the terminal device cannot simultaneously perform the TA adjustment and the uplink transmission.

In order to solve the above technical problem, in the present disclosure, the network device may also configure the terminal device with the configuration information of the uplink gap. When the uplink channel is the NPRACH, the configuration information of the uplink gap is used by the terminal device to perform the TA pre-compensation on the uplink gap. When the uplink channel is the NPUSCH, the configuration information of the uplink gap is used by the terminal device to perform the TA adjustment on the uplink gap.

It should be noted that the TA pre-compensation is TA compensation calculated by the terminal device and to be performed by the terminal device in the random access process.

It should be understood that the TA pre-compensation is also referred to as TA compensation, TA pre-compensation value, etc. The embodiment of the present disclosure is not limited to this.

Optionally, when the uplink channel is the NPUSCH, the terminal device may perform the TA adjustment based on a TA adjustment command or TA compensation capability of the terminal device itself.

It should be noted that both the TA adjustment and TA pre-compensation mean that the terminal device adjusts the TA thereof. When the Msg1 is transmitted during the random access, the terminal device has no valid TA at this time, so that the TA pre-compensation is performed. When the terminal device is in a connected state, the terminal device maintains and adjusts the TA.

Optionally, in the embodiment, the configuration information of the uplink gap is carried, without limitation, in any one of: the broadcast message, the RRC signaling, the MAC CE, and the DCI.

Optionally, in the embodiment, the configuration information of the uplink gap includes: a time length of the uplink gap, and/or an insertion interval of the uplink gap. The uplink gap occurs whenever the uplink channel lasts for the insertion interval.

It is worth mentioning that the present disclosure is not limited with regard to how the network device determines the time length of the uplink gap, and/or the insertion interval of the uplink gap.

Optionally, the time length of the uplink gap may be predefined, and the network device only needs to configure the terminal device with the insertion interval of the uplink gap. Alternatively, the insertion interval of the uplink gap may be predefined, and the network device only needs to configure the terminal device with the time length of the uplink gap.

Optionally, the network device may further transmit the resource configuration of the uplink channel to the terminal device.

Optionally, the resource configuration of the uplink channel is carried, without limitation, in any one of: the broadcast message, the RRC signaling, the MAC CE, and the DCI.

Optionally, the uplink channel may be the NPRACH or the NPUSCH, but is not limited thereto.

Optionally, when broadcasting resource configuration of the NPRACH through the broadcast message, the network device may broadcast or configure the resource configuration of at least one NPRACHs one time. Based on this, the configuration information of the uplink gap is the configuration information for the at least one NPRACHs, namely, the configuration information of the uplink gap may correspond to one NPRACH resource or the plurality of NPRACH resources. For example, the configuration information of the uplink gap may be configured based on each set of NPRACH resources, or all NPRACH resources may use the same configuration information of the uplink gap.

Optionally, the resource configuration of each NPRACH includes but is not limited to at least one of: the cycle of the NPRACH, the start time of the NPRACH resource in one cycle, the start subcarrier position of the NPRACH resource, the number of consecutive subcarriers occupied by the NPRACH resource on the frequency domain, and the number of times of the repeated transmissions of the preamble.

In summary, in the present disclosure, for the GEO scenario in the NTN network, the terminal device may insert the uplink gap in the uplink transmission according to the configuration information of the uplink gap, so as to perform the TA pre-compensation or the TA adjustment. Therefore, the terminal device can accurately perform the TA pre-compensation or TA adjustment and the uplink transmission regardless of whether the TA becomes smaller or larger.

It should be noted that, for convenience, when the uplink channel is the NPRACH and the uplink gap is used by the terminal device to perform the downlink synchronization and frequency offset compensation on the uplink gap, the uplink gap is referred to as a first uplink gap. When the uplink channel is the NPRACH and the uplink gap is used by the terminal device to perform the TA pre-compensation on the uplink gap, the uplink gap is referred to as a second uplink gap. When the uplink channel is the NPUSCH and the uplink gap is used by the terminal device to perform the downlink synchronization and frequency offset compensation on the uplink gap, the uplink gap is referred to as a third uplink gap. When the uplink channel is the NPUSCH and the uplink gap is used by the terminal device to perform the TA adjustment on the uplink gap, the uplink gap is referred to as a fourth uplink gap.

Optionally, the first uplink gap, the second uplink gap, the third uplink gap, and the fourth uplink gap may be completely different, partially the same, or completely the same. For example, the first uplink gap and the second uplink gap may be the same, and the third uplink gap and the fourth uplink gap may be the same. Alternatively, the first uplink gap may be the same as the third uplink gap, and the second uplink gap may be the same as the fourth uplink gap. Alternatively, the first uplink gap, the second uplink gap, the third uplink gap, and the fourth uplink gap are different from each other. Alternatively, the first uplink gap, the second uplink gap, the third uplink gap, and the fourth uplink gap are all the same. In summary, the present disclosure is not limited in this regard.

Embodiment 3

As described above, in the current LTE, considering the switching time between transmitting and receiving operations of the terminal device, the terminal device starts the RAR window after a period of time following transmitting the Msg1. For the NB-IoT terminal, the start subframe of the RAR window is denoted as n+X; n represents the last subframe where the last repeated transmission including the preamble is located, and the value of X is determined based on the TDD or FDD and the number of times of NPRACH repeated transmissions. In some embodiments, the value of X may be determined by Table 1.

Here, in Table 1, X=41, which actually is 40+1, and 40 herein is the predefined time length of the uplink gap. As in the present disclosure, in the non-GEO scenario of the NTN network, the uplink gap is no longer predefined, but is configured by the network device. Based on this, a start time of the RAR window may also change. A detailed description is made below.

Optionally, it is assumed that the insertion interval and time length of the first uplink gap are represented by X1 and Y1, respectively. Then, the start time of the RAR window may be n+Z1, where n represents a last subframe used by the last repeated transmission of the preamble, and Z1 is determined based on a total time length of repeated transmissions of the preamble or a time length from an end time of a last first uplink gap inserted in the entire repeated transmissions of the preamble to an end time of the entire repeated transmissions of the preamble and an RTT of signal transmission between the terminal device and the network device.

Figure 6:
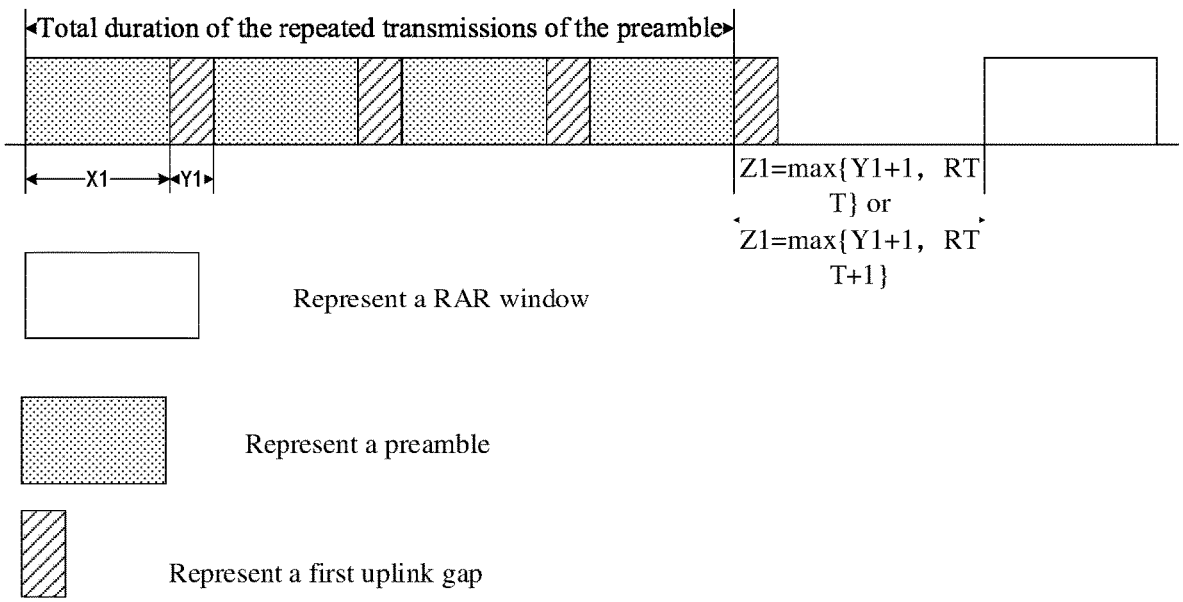
FIG. 6 is a schematic diagram of a relationship between a preamble, a first uplink gap and a random access response window (RAR window) according to an embodiment of the present disclosure.

Optionally, it is assumed that Z1 is determined based on the total time length of repeated transmissions of the preamble. When the total time length of the repeated transmissions of the preamble is greater than or equal to X1, Z1=max{Y1+1, RTT} or Z1=max{Y1+1, RTT+1}. For example, FIG. 6 is a schematic diagram of a relationship between a preamble, a first uplink gap and an RAR window according to an embodiment of the present disclosure. As illustrated in FIG. 6, the total time length of the repeated transmissions of the preamble is greater than X1, and in this case, Z1=max{Y1+1, RTT} or Z1=max{Y1+1, RTT+1}.

When the total time length of the repeated transmissions of the preamble is smaller than X1, Z1=max{4, RTT} or Z1=max{4, RTT+1}.

Figure 7:
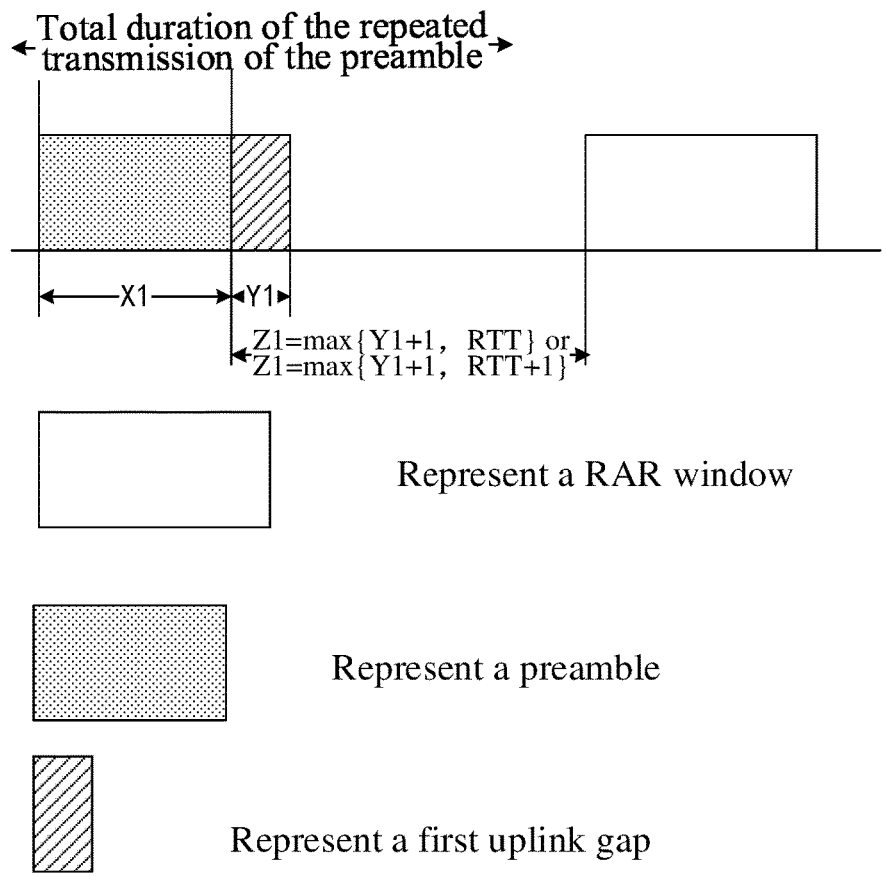
FIG. 7 is a schematic diagram of a relationship between a preamble, a first uplink gap and an RAR window according to another embodiment of the present disclosure.
Figure 8:
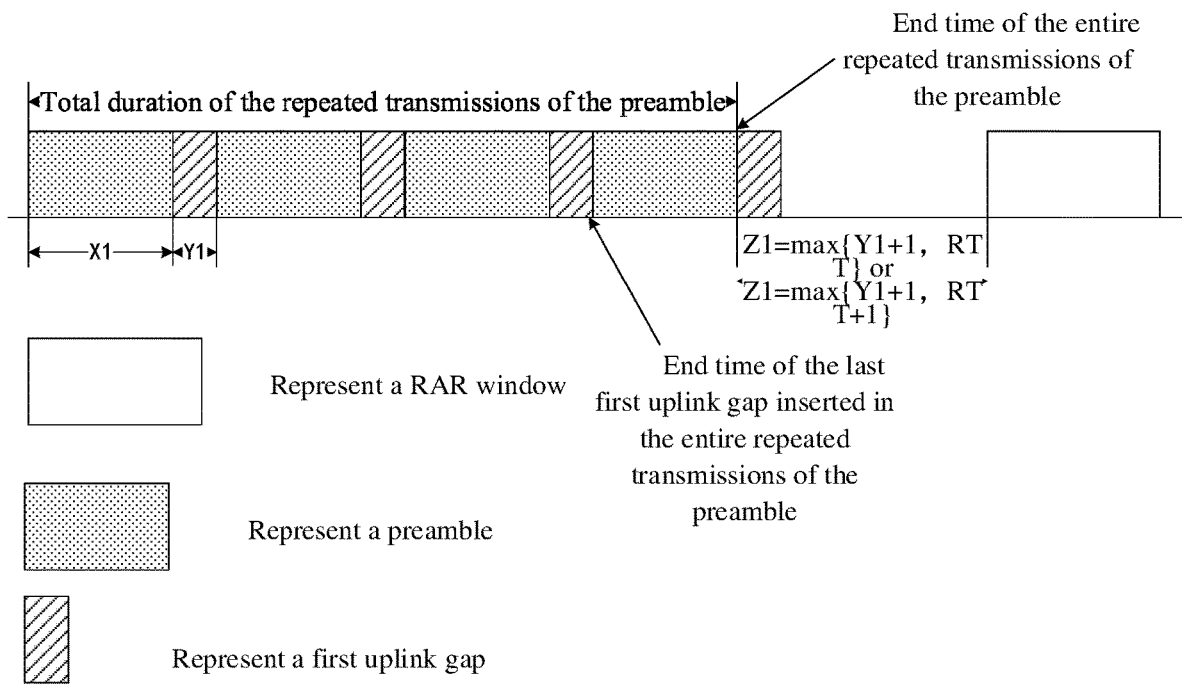
FIG. 8 is a schematic diagram of a relationship between a preamble, a first uplink gap and an RAR window according to yet another embodiment of the present disclosure.

Optionally, it is assumed that Z1 is determined based on the time length from the end time of the last uplink gap inserted in the entire repeated transmissions of the preamble to the end time of the entire repeated transmissions of the preamble and the RTT of signal transmission between the terminal device and the network device. When the total time length of the repeated transmissions of the preamble is equal to X1, Z1=max{Y1+1, RTT} or Z1=max{Y1+1, RTT+1}. For example, FIG. 7 is a schematic diagram of a relationship between a preamble, a first uplink gap and an RAR window according to another embodiment of the present disclosure. As illustrated in FIG. 7, the total time length of the repeated transmissions of the preamble is equal to X1, and Z1=max{Y1+1, RTT} or Z1=max{Y1+1, RTT+1}. Alternatively, when the time length from the end time of the last first uplink gap inserted in the entire repeated transmissions of the preamble to the end time of the entire repeated transmissions of the preamble is equal to X1, Z1=max{Y1+1, RTT} or Z1=max{Y1+1, RTT+1}. For example, FIG. 8 is a schematic diagram of a relationship between a preamble, a first uplink gap and an RAR window according to yet another embodiment of the present disclosure. As illustrated in FIG. 8, the time length from the end time of the last first uplink gap inserted in the entire repeated transmissions of the preamble to the end time of the entire repeated transmissions of the preamble is equal to X1, and in this case, Z1=max{Y1+1, RTT} or Z1=max{Y1+1, RTT+1}. When the total time length of the repeated transmissions of the preamble is smaller than X1, Z1=max{4, RTT} or Z1=max{4, RTT+1}. Alternatively, when the time length from the end time of the last first uplink gap inserted in the entire repeated transmissions of the preamble to the end time of the entire repeated transmissions of the preamble is smaller than X1, Z1=max{4, RTT} or Z1=max{4, RTT+1}.

The above describes how to determine the start time of the RAR window on the basis of the first uplink gap.

In fact, in the present disclosure, the start time of the RAR window may also be determined on the basis of the second uplink gap. Certainly, the start time of the RAR window can only be determined based on the first uplink gap or the second uplink gap.

Optionally, a start time of the RAR window is n+Z3, where n represents a last subframe used by a last repeated transmission of the preamble, and Z3 is determined based on a total time length of repeated transmissions of the preamble or a time length from an end time of a last second uplink gap inserted in the entire repeated transmissions of the preamble to an end time of the entire repeated transmissions of the preamble and an RTT of signal transmission between the terminal device and a network device.

Optionally, when the total time length of the repeated transmissions of the preamble is greater than or equal to X3, Z3=max{Y3+1, RTT} or Z3=max{Y3+1, RTT+1}. When the total time length of the repeated transmissions of the preamble is smaller than X3, Z3=max{4, RTT} or Z3=max{4, RTT+1}. X3 represents an insertion interval of the uplink gap, and Y3 represents a time length of the second uplink gap.

Optionally, when the total time length of the repeated transmissions of the preamble or the time length from the end time of the last second uplink gap inserted in the entire repeated transmissions of the preamble to the end time of the entire repeated transmissions of the preamble is equal to X3, Z3=max{Y3+1, RTT} or Z3=max{Y3+1, RTT+1}. When the total time length of the repeated transmissions of the preamble or the time length from the end time of the last second uplink gap inserted in the entire repeated transmissions of the preamble to the end time of the entire repeated transmissions of the preamble is smaller than X3, Z3=max{4, RTT} or Z3=max{4, RTT+1}.

It is worth mentioning that a method for determining the start time of the RAR window on the basis of a second time interval is similar to the method for determining the start time of the RAR window on the basis of a first time interval, and details thereof will be omitted herein.

In summary, the present disclosure provides a method for determining the start time of the RAR window in the non-GEO scenario of the NTN network.

Method embodiments of the present disclosure are described in detail above with reference to FIG. 4 to FIG. 8, and apparatus embodiments of the present disclosure will be described in detail below with reference to FIG. 9 to FIG. 15. It should be understood that the apparatus embodiments correspond to the method embodiments, and similar description of the apparatus embodiments can refer to the method embodiments.

Figure 9:
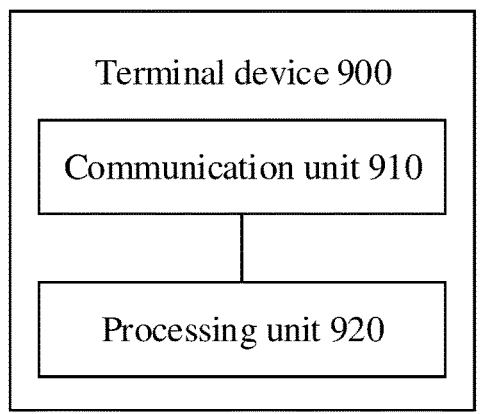
FIG. 9 is a schematic block diagram of a terminal device 900 according to an embodiment of the present disclosure.

FIG. 9 is a schematic block diagram of a terminal device 900 according to an embodiment of the present disclosure. As illustrated in FIG. 9, the terminal device 900 includes a communication unit 910 configured to obtain configuration information of an uplink gap; and repeatedly transmit, based on the configuration information of the uplink gap, uplink information on an uplink channel. The uplink gap is used for the terminal device to perform downlink synchronization and frequency offset compensation on the uplink gap.

Optionally, the configuration information of the uplink gap includes: a time length of the uplink gap, and/or an insertion interval of the uplink gap. The uplink gap occurs whenever the uplink channel lasts for the insertion interval.

Optionally, the uplink channel is an NPRACH.

Optionally, the uplink gap is further used for the terminal device to perform TA pre-compensation and/or downlink synchronization and frequency offset compensation on the uplink gap.

Optionally, the configuration information of the uplink gap is configuration information for at least one NPRACH.

Optionally, the uplink information is a preamble in a random access process; and the terminal device further includes: a processing unit 920 configured to start, subsequent to transmitting the preamble, an RAR window. A start time of the RAR window is n+Z1, where n represents a last subframe used by a last repeated transmission of the preamble, and Z1 is determined based on a total time length of repeated transmissions of the preamble or a time length from an end time of a last uplink gap inserted in the entire repeated transmissions of the preamble to an end time of the entire repeated transmissions of the preamble and an RTT of signal transmission between the terminal device and a network device.

Optionally, when the total time length of the repeated transmissions of the preamble is greater than or equal to X1, Z1=max{Y1+1, RTT} or Z1=max{Y1+1, RTT+1}. When the total time length of the repeated transmissions of the preamble is smaller than X1, Z1=max{4, RTT} or Z1=max{4, RTT+1}. X1 represents an insertion interval of the uplink gap, and Y1 represents a time length of the uplink gap.

Optionally, when the total time length of the repeated transmissions of the preamble or the time length from the end time of the last uplink gap inserted in the entire repeated transmissions of the preamble to the end time of the entire repeated transmissions of the preamble is equal to X1, Z1=max{Y1+1, RTT} or Z1=max{Y1+1, RTT+1}. When the total time length of the repeated transmissions of the preamble or the time length from the end time of the last uplink gap inserted in the entire repeated transmissions of the preamble to the end time of the entire repeated transmissions of the preamble is smaller than X1, Z1=max{4, RTT} or Z1=max{4, RTT+1}. X1 represents an insertion interval of the uplink gap, and Y1 represents a time length of the uplink gap.

Optionally, the uplink channel is an NPUSCH.

Optionally, the uplink gap is further used for the terminal device to perform a TA adjustment and/or downlink synchronization and frequency offset compensation on the uplink gap.

Optionally, the configuration information of the uplink gap is carried in any one of: a broadcast message, an RRC signaling, a MAC CE, and DCI.

Optionally, in some embodiments, the communication unit may be a communication interface or a transceiver, or an input/output interface of a communication chip or a system-on-chip. The processing unit may be one or more processors.

It should be understood that the terminal device 900 according to the embodiments of the present disclosure may correspond to the terminal device in the method embodiments of the present disclosure, and the above and other operations and/or functions of each unit in the terminal device 900 are respectively intended to implement corresponding procedures of the terminal device in the method embodiments described above. For brevity, details thereof will be omitted herein.

Figure 10:
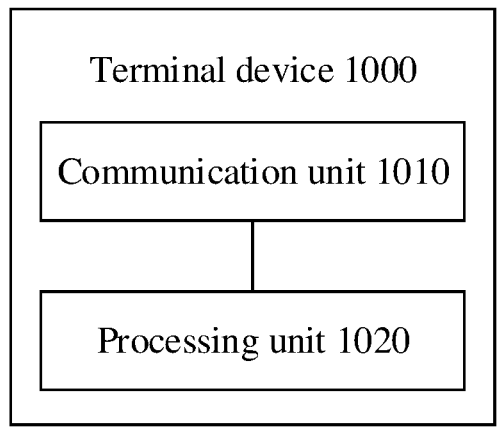
FIG. 10 is a schematic block diagram of a terminal device 1000 according to an embodiment of the present disclosure.

FIG. 10 is a schematic block diagram of a terminal device 1000 according to an embodiment of the present disclosure. As illustrated in FIG. 10, the terminal device 1000 includes a communication unit 1010 configured to: obtain configuration information of an uplink gap; and repeatedly transmit, based on the configuration information of the uplink gap, uplink information on an uplink channel. The uplink gap is used for the terminal device to perform TA pre-compensation or a TA adjustment on the uplink gap.

Optionally, the configuration information of the uplink gap includes: a time length of the uplink gap, and/or an insertion interval of the uplink gap. The uplink gap occurs whenever the uplink channel lasts for the insertion interval.

Optionally, the uplink channel is an NPRACH.

Optionally, the uplink gap is used for the terminal device to perform the TA pre-compensation and/or downlink synchronization and frequency offset compensation on the uplink gap.

Optionally, the configuration information of the uplink gap is configuration information for at least one NPRACH.

Optionally, the uplink information is a preamble in a random access process; and the terminal device further includes: a processing unit 1020 configured to start, subsequent to transmitting the preamble, an RAR window. A start time of the RAR window is n+Z3, where n represents a last subframe used by a last repeated transmission of the preamble, and Z3 is determined based on a total time length of repeated transmissions of the preamble or a time length from an end time of a last uplink gap inserted in the entire repeated transmissions of the preamble to an end time of the entire repeated transmissions of the preamble and an RTT of signal transmission between the terminal device and a network device.

Optionally, when the total time length of the repeated transmissions of the preamble is greater than or equal to X3, Z3=max{Y3+1, RTT} or Z3=max{Y3+1, RTT+1}. When the total time length of the repeated transmissions of the preamble is smaller than X3, Z3=max{4, RTT} or Z3=max{4, RTT+1}. X3 represents an insertion interval of the uplink gap, and Y13 represents a time length of the uplink gap.

Optionally, when the total time length of the repeated transmissions of the preamble or the time length from the end time of the last uplink gap inserted in the entire repeated transmissions of the preamble to the end time of the entire repeated transmissions of the preamble is equal to X3, Z3=max{Y3+1, RTT} or Z3=max{Y3+1, RTT+1}. When the total time length of the repeated transmissions of the preamble or the time length from the end time of the last uplink gap inserted in the entire repeated transmissions of the preamble to the end time of the entire repeated transmissions of the preamble is smaller than X3, Z3=max{4, RTT} or Z3=max{4, RTT+1}. X3 represents an insertion interval of the uplink gap, and Y3 represents a time length of the uplink gap.

Optionally, the uplink channel is an NPUSCH.

Optionally, the uplink gap is further used for the terminal device to perform the TA adjustment on the uplink gap.

Optionally, the configuration information of the uplink gap is carried in any one of: a broadcast message, an RRC signaling, a MAC CE, and DCI.

Optionally, in some embodiments, the communication unit may be a communication interface or a transceiver, or an input/output interface of a communication chip or a system-on-chip. The processing unit may be one or more processors.

It should be understood that the terminal device 1000 according to the embodiments of the present disclosure may correspond to the terminal device in the method embodiments of the present disclosure, and the above and other operations and/or functions of each unit in the terminal device 1000 are respectively intended to implement corresponding procedures of the terminal device in the method embodiments described above. For brevity, details thereof will be omitted herein.

Figure 11:
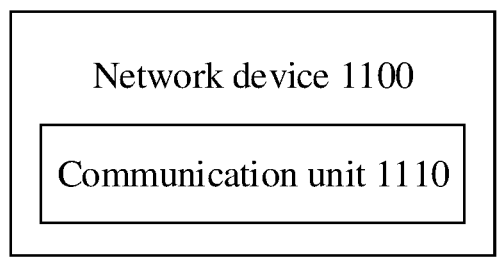
FIG. 11 is a schematic block diagram of a network device 1100 according to an embodiment of the present disclosure.

FIG. 11 is a schematic block diagram of a network device 1100 according to an embodiment of the present disclosure. As illustrated in FIG. 11, the network device 1100 includes a communication unit 1110 configured to transmit configuration information of an uplink gap. The uplink gap is used for a terminal device to perform downlink synchronization and frequency offset compensation on the uplink gap.

Optionally, the configuration information of the uplink gap includes: a time length of the uplink gap, and/or an insertion interval of the uplink gap. The uplink gap occurs whenever the uplink channel lasts for the insertion interval.

Optionally, the uplink channel is an NPRACH.

Optionally, the uplink gap is further used for the terminal device to perform TA pre-compensation and/or downlink synchronization and frequency offset compensation on the uplink gap.

Optionally, the configuration information of the uplink gap is configuration information for at least one NPRACH.

Optionally, the uplink channel is an NPUSCH.

Optionally, the uplink gap is further used for the terminal device to perform a TA adjustment on the uplink gap.

Optionally, the configuration information of the uplink gap is carried in any one of: a broadcast message, an RRC signaling, a MAC CE, and DCI.

Optionally, in some embodiments, the communication unit may be a communication interface or a transceiver, or an input/output interface of a communication chip or a system-on-chip.

It should be understood that the network device 1100 according to the embodiments of the present disclosure may correspond to the network device in the method embodiments of the present disclosure, and the above and other operations and/or functions of each unit in the network device 1100 are respectively intended to implement corresponding procedures of the network device in the method embodiments described above. For brevity, details thereof will be omitted herein.

Figure 12:
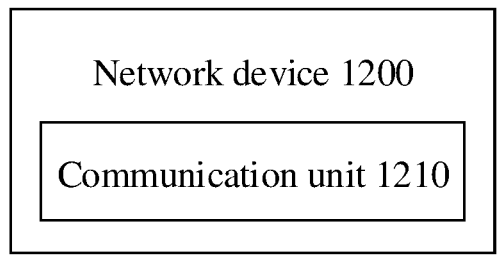
FIG. 12 is a schematic block diagram of a network device 1200 according to an embodiment of the present disclosure.

FIG. 12 is a schematic block diagram of a network device 1200 according to an embodiment of the present disclosure. As illustrated in FIG. 12, the network device 1200 includes a communication unit 1210 configured to transmit configuration information of an uplink gap. The uplink gap is used for a terminal device to perform TA pre-compensation or a TA adjustment on the uplink gap.

Optionally, the configuration information of the uplink gap includes: a time length of the uplink gap, and/or an insertion interval of the uplink gap. The uplink gap occurs whenever the uplink channel lasts for the insertion interval.

Optionally, the uplink channel is an NPRACH.

Optionally, the uplink gap is used for the terminal device to perform the TA pre-compensation and/or downlink synchronization and frequency offset compensation on the uplink gap.

Optionally, the configuration information of the uplink gap is configuration information for at least one NPRACH.

Optionally, the uplink channel is an NPUSCH.

Optionally, the uplink gap is further used for the terminal device to perform the TA adjustment on the uplink gap.

Optionally, the configuration information of the uplink gap is carried in any one of: a broadcast message, an RRC signaling, a MAC CE, and DCI.

Optionally, in some embodiments, the communication unit may be a communication interface or a transceiver, or an input/output interface of a communication chip or a system-on-chip.

It should be understood that the network device 1200 according to the embodiments of the present disclosure may correspond to the network device in the method embodiments of the present disclosure, and the above and other operations and/or functions of each unit in the network device 1200 are respectively intended to implement corresponding procedures of the network device in the method embodiments described above. For brevity, details thereof will be omitted herein.

Figure 13:
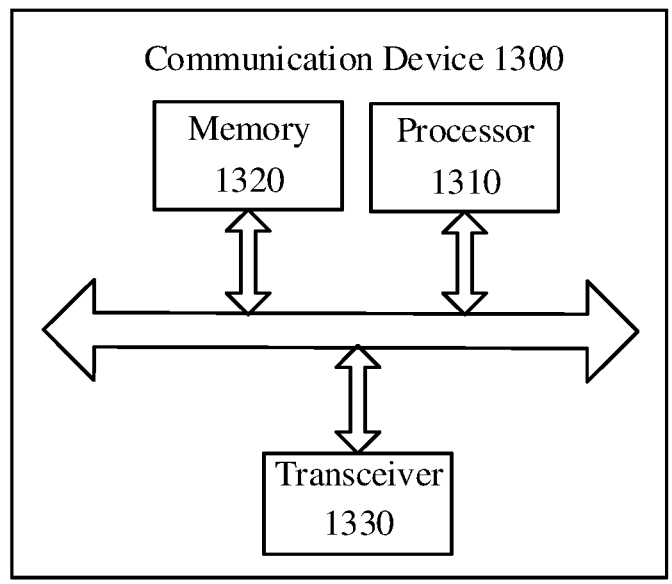
FIG. 13 is a schematic block diagram of a communication device 1300 according to an embodiment of the present disclosure.

FIG. 13 is a schematic block diagram of a communication device 1300 according to an embodiment of the present disclosure. The communication device 1300 shown in FIG. 13 includes a processor 1310. The processor 1310 is configured to invoke and run a computer program from a memory to perform the method according to any of the embodiments of the present disclosure.

Optionally, as illustrated in FIG. 13, the communication device 1300 may further include a memory 1320. The processor 1310 may invoke and run a computer program from the memory 1320 to perform the method according to any of the embodiments of the present disclosure.

Here, the memory 1320 may be a separate component independent of the processor 1310, or may be integrated in the processor 1310.

Optionally, as illustrated in FIG. 13, the communication device 1300 may further include a transceiver 1330. The processor 1310 may control the transceiver 1330 to communicate with other devices, specifically, to transmit information or data to other devices, or receive information or data transmitted by other devices.

Here, the transceiver 1330 may include a transmitter and a receiver. The transceiver 1330 may further include one or more antennas.

Optionally, the communication device 1300 may specifically be a network device according to an embodiment of the present disclosure. The communication device 1300 may execute corresponding processes implemented by the network device in the method according to any of the embodiments of the present disclosure. For brevity, details thereof will be omitted herein.

Optionally, the communication device 1300 may specifically be the terminal device according to any of the embodiments of the present disclosure. The communication device 1300 may implement corresponding processes implemented by the terminal device in the method according to any of the embodiments of the present disclosure. For brevity, details thereof will be omitted herein.

Figure 14:
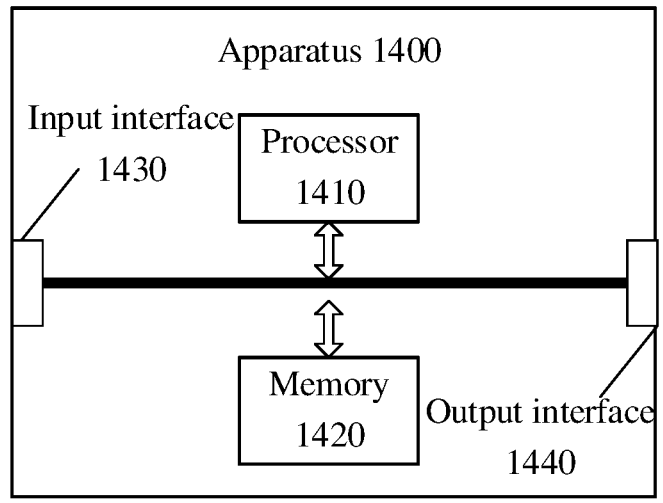
FIG. 14 is a schematic block diagram of an apparatus according to an embodiment of the present disclosure.

FIG. 14 is a schematic diagram showing a structure of an apparatus according to an embodiment of the present disclosure. An apparatus 1400 illustrated in FIG. 14 includes a processor 1410. The processor 1410 can invoke and run a computer program from a memory to perform the method according to any of the embodiments of the present disclosure.

Optionally, as illustrated in FIG. 14, the apparatus 1400 may further include a memory 1420. The processor 1410 may invoke and run a computer program from the memory 1420 to perform the method according to any of the embodiments of the present disclosure.

Here, the memory 1420 may be a separate component independent of the processor 1410, or may be integrated in the processor 1410.

Optionally, the apparatus 1400 may further include an input interface 1430. The processor 1410 can control the input interface 1430 to communicate with other devices or chips, specifically, to obtain information or data transmitted by other devices or chips.

Optionally, the apparatus 1400 may further include an output interface 1440. The processor 1410 can control the output interface 1440 to communicate with other devices or chips, specifically, to output information or data to other devices or chips.

Optionally, the apparatus can be applied to the network device according to any of the embodiments of the present disclosure. In addition, the apparatus can implement corresponding processes implemented by the network device in the method according to any of the embodiments of the present disclosure. For brevity, details thereof will be omitted herein.

Optionally, the apparatus can be applied to the terminal device according to any of the embodiments of the present disclosure. The apparatus can implement corresponding processes implemented by the terminal device in the method according to any of the embodiments of the present disclosure. For brevity, details thereof will be omitted herein.

Optionally, the apparatus mentioned in the embodiments of the present disclosure may a chip. For example, the chip may be a system-level chip, a system-chip, a chip system, or a system-on-chip.

Figure 15:
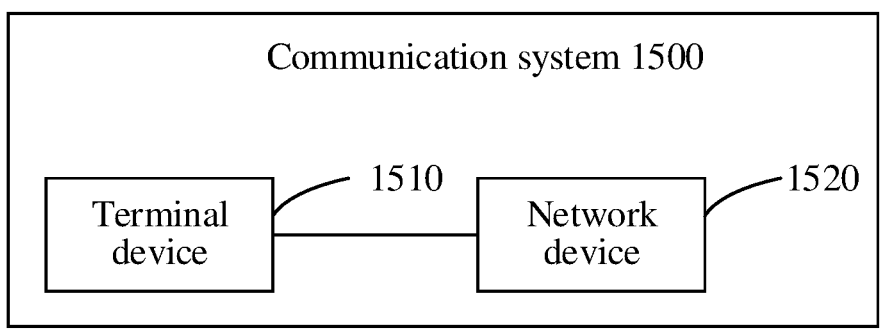
FIG. 15 is a schematic block diagram of a communication system 1500 according to an embodiment of the present disclosure.

FIG. 15 is a schematic block diagram of a communication system 1500 according to an embodiment of the present disclosure. As illustrated in FIG. 15, the communication system 1500 includes a terminal device 1510 and a network device 1520.

Here, the terminal device 1510 can be configured to implement the corresponding functions implemented by the terminal device in the above methods. The network device 1520 can be configured to implement corresponding functions implemented by the network device or the base station in the above methods. For brevity, details thereof will be omitted herein.

It should be understood that the processor in the embodiment of the present disclosure may be an integrated circuit chip with signal processing capability. In an implementation, the steps of the above method embodiments can be implemented by hardware integrated logic circuits in a processor or instructions in the form of software. The above processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or the processor and may be any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as a Random Access Memory (RAM), a flash memory, a Read-Only Memory (ROM), a Programmable ROM, an electrically erasable programmable memory, or a register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be an ROM, a Programmable ROM (PROM), an Erasable PROM (EPROM), an Electrically EPROM (EEPROM), or a flash memory. The transitory memory may be an RAM, which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device or the base station in the embodiment of the present disclosure, and the computer program can cause a computer to perform corresponding procedures implemented by the network device or the base station in the method according to any of the embodiments of the present disclosure. For brevity, description thereof is omitted herein.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. For brevity, description thereof is omitted herein.

An embodiment of the present disclosure also provides a computer program product including computer program instructions.

Optionally, the computer program product can be applied to the network device or the base station in the embodiment of the present disclosure, and the computer program instructions can cause a computer to perform corresponding procedures implemented by the network device or the base station in the method according to any of the embodiments of the present disclosure. For brevity, details thereof will be omitted here.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. For brevity, details thereof will be omitted here.

An embodiment of the present disclosure also provides a computer program.

Optionally, the computer program can be applied to the network device or the base station in the embodiment of the present disclosure. The computer program, when executed on a computer, can cause the computer to perform corresponding procedures implemented by the network device or the base station in each method according to the embodiments of the present disclosure. For brevity, details thereof will be omitted here.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. For brevity, details thereof will be omitted here.

It can be appreciated by those skilled in the art that units and algorithm steps in the examples described in connection to the embodiments disclosed herein can be implemented in an electronic hardware or any combination of a computer software and an electronic hardware. Whether these functions are executed by a hardware or a software depends on specific applications and design constraint conditions of the technical solutions. Those skilled in the art may use different methods for each specific application to implement the described functions, and such implementation is to be encompassed by the scope of the present disclosure.

Those skilled in the art can clearly understand that, for the convenience and conciseness of the description, for the specific operation processes of the systems, apparatuses, and units described above, reference can be made to the corresponding processes in the above method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between apparatuses or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method, performed by a terminal device, comprising:
    obtaining configuration information of an uplink gap; and
    transmitting, based on the configuration information of the uplink gap, uplink information on an uplink channel repeatedly, wherein the uplink gap is used for the terminal device to perform timing advance (TA) pre-compensation or TA adjustment on the uplink gap;
    wherein the configuration information of the uplink gap comprises one or more of: a time length of the uplink gap, and an insertion interval of the uplink gap, wherein the uplink gap occurs whenever the uplink channel lasts for the insertion interval.

2. The method according to claim 1, wherein the uplink channel is a narrowband physical random access channel (NPRACH).

3. The method according to claim 2, wherein the uplink gap is used for the terminal device to perform the TA pre-compensation on the uplink gap.

4. The method according to claim 2, wherein the configuration information of the uplink gap is configuration information for at least one NPRACH.

5. The method according to claim 1, wherein the uplink channel is a narrowband physical uplink shared channel (NPUSCH).

6. The method according to claim 5, wherein the uplink gap is further used for the terminal device to perform the TA adjustment on the uplink gap.

7. The method according to claim 1, wherein the configuration information of the uplink gap is carried in any one of: a broadcast message, radio resource control (RRC) signaling, a media access control control element (MAC CE), and downlink control information (DCI).

8. A non-transitory computer-readable storage medium, storing a computer program that causes a computer to perform the method according to claim 1.

9. A network device, comprising a processor and a memory, wherein the memory has a computer program stored thereon, and the processor is configured to invoke and execute the computer program stored in the memory to perform a wireless communication method comprising:
    transmitting configuration information of an uplink gap, wherein the uplink gap is used for a terminal device to perform timing advance (TA) pre-compensation or TA adjustment on the uplink gap;
    wherein the configuration information of the uplink gap comprises one or more of: a time length of the uplink gap, and an insertion interval of the uplink gap, wherein the uplink gap occurs whenever the uplink channel lasts for the insertion interval.

10. The network device according to claim 9, wherein the configuration information of the uplink gap is carried in any one of: a broadcast message, radio resource control (RRC) signaling, a media access control control element (MAC CE), and downlink control information (DCI).

11. A non-transitory computer-readable storage medium, storing a computer program that causes a computer to perform the method according to claim 9.

12. The network device according to claim 9, wherein the uplink channel is a narrowband physical random access channel (NPRACH).

13. The network device according to claim 12, wherein the uplink gap is used for the terminal device to perform the TA pre-compensation on the uplink gap.

14. The network device according to claim 12, wherein the configuration information of the uplink gap is configuration information for at least one NPRACH.

15. The network device according to claim 9, wherein the uplink channel is a narrowband physical uplink shared channel (NPUSCH).

16. The network device according to claim 15, wherein the uplink gap is further used for the terminal device to perform the TA adjustment on the uplink gap.

17. A terminal device, comprising a processor and a memory, wherein the memory has a computer program stored thereon, and the processor is configured to invoke and execute the computer program stored in the memory to perform a wireless communication method comprising:
    obtaining configuration information of an uplink gap; and
    transmitting, based on the configuration information of the uplink gap, uplink information on an uplink channel repeatedly, wherein the uplink gap is used for a terminal device to perform timing advance (TA) pre-compensation or TA adjustment on the uplink gap;
    wherein the configuration information of the uplink gap comprises one or more of: a time length of the uplink gap, and an insertion interval of the uplink gap, wherein the uplink gap occurs whenever the uplink channel lasts for the insertion interval.

18. The terminal device according to claim 17, wherein the uplink channel is a narrowband physical random access channel (NPRACH).

19. The terminal device according to claim 18, wherein the uplink gap is used for the terminal device to perform the TA pre-compensation on the uplink gap.

\* \* \* \* \*